United States Patent
Lee et al.

(10) Patent No.: US 9,608,707 B2
(45) Date of Patent: Mar. 28, 2017

(54) HYBRID VIRTUAL ANTENNA MAPPING FOR MULTIPLE-INPUT MULTIPLE-OUTPUT SYSTEM

(71) Applicant: QUALCOMM Incorporated, San Diego, CA (US)

(72) Inventors: Heechoon Lee, San Diego, CA (US); Sanaz Barghi, San Diego, CA (US); Feng Han, San Diego, CA (US); Sharad Deepak Sambhwani, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 73 days.

(21) Appl. No.: 14/686,393

(22) Filed: Apr. 14, 2015

(65) Prior Publication Data

US 2015/0326293 A1    Nov. 12, 2015

Related U.S. Application Data

(60) Provisional application No. 61/990,005, filed on May 7, 2014.

(51) Int. Cl.
*H04B 7/04* (2006.01)
*H04W 52/06* (2009.01)
*H04B 7/06* (2006.01)

(52) U.S. Cl.
CPC ......... *H04B 7/0473* (2013.01); *H04B 7/0465* (2013.01); *H04B 7/0615* (2013.01); *H04W 52/06* (2013.01); *H04B 7/0639* (2013.01)

(58) Field of Classification Search
CPC .................................................. H04B 7/0473
See application file for complete search history.

(56) References Cited

U.S. PATENT DOCUMENTS

2011/0281536 A1* 11/2011 Lee ...................... H04B 7/0613
455/129
2011/0293037 A1* 12/2011 Liu ......................... H04L 5/001
375/295

(Continued)

FOREIGN PATENT DOCUMENTS

WO    WO-2012/053948 A1    4/2012

OTHER PUBLICATIONS

International Search Report and Written Opinion—PCT/US2015/029107—ISA/EPO—Jul. 22, 2015 (14 total pages).

*Primary Examiner* — Jason Mattis
(74) *Attorney, Agent, or Firm* — Arent Fox LLP

(57) ABSTRACT

Aspects for balancing power output on the plurality of antennas for the transmission of a transport block are disclosed. In accordance with the present disclosure, a transmitter may balance the power output on a plurality of transmit antennas in a multiple-input multiple-output (MIMO) system by having a precoded data block bypass a virtual antenna mapping of the overhead channels (e.g., control channels). Additionally or alternatively, the transmitter may balance the power output on the plurality of transmit antennas by applying an inverse mapping parameter during the precoding process to the transport block to generate a plurality of inverse mapped precoded data blocks. In some examples, the inverse mapping parameter may be an inverse of the mapping parameter. Thus, in accordance with the present disclosure, precoding a transport block may include selecting a precoding weight for each of the plurality of antennas from an unrestricted precoding weight set.

27 Claims, 8 Drawing Sheets

(56) References Cited

U.S. PATENT DOCUMENTS

| | | | |
|---|---|---|---|
| 2013/0100997 A1* | 4/2013 | Wang | H04B 7/0413 |
| | | | 375/219 |
| 2013/0181868 A1* | 7/2013 | Le Pezennec | H04B 7/0465 |
| | | | 342/372 |
| 2013/0202058 A1* | 8/2013 | Asplund | H04B 7/024 |
| | | | 375/295 |
| 2016/0013843 A1* | 1/2016 | Zhang | H04W 52/04 |
| | | | 375/267 |

* cited by examiner

HYBRID VIRTUAL ANTENNA MAPPING FOR MULTIPLE-INPUT MULTIPLE-OUTPUT SYSTEM

CROSS-REFERENCE TO RELATED APPLICATION(S)

This application claims priority to U.S. Provisional Application Ser. No. 61/990,005, entitled, "HYBRID VAM FOR UMTS MIMO," and filed on May 7, 2014, which is assigned to the assignee hereof and hereby expressly incorporated by reference herein in its entirety.

BACKGROUND

Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., an LTE system).

By way of example, a wireless multiple-access communications system may include a number of base stations, each simultaneously supporting communication for multiple communication devices, which may be otherwise known as user equipment (UEs), mobile devices or stations (STAs). A base station may communicate with the communication devices on downlink channels (e.g., for transmissions from a base station to a UE) and uplink channels (e.g., for transmissions from a UE to a base station).

In wireless communications systems, a transmitter (e.g. base station) may utilize multiple ($N_T$) transmit antennas for data transmission to a receiver (e.g., communication device) equipped with multiple ($N_R$) receive antennas. The multiple transmit and receive antennas form a multiple-input multiple-output (MIMO) channel that may be used to increase throughput and/or improve reliability. For example, the transmitter may transmit up to $N_T$ data streams concurrently from the $N_T$ transmit antennas to improve throughput. Alternatively, the transmitter may transmit a single data stream from all $N_T$ transmit antennas to improve reception by the receiver. Each data stream may carry one transport block or packet of data in a given transmission time interval.

In some aspects, good performance (e.g., high throughput) may be achieved by precoding one or more data streams with a precoding matrix selected based on the response of the MIMO channel from the transmitter to the receiver. Precoding may also be referred to as beamforming, spatial mapping, etc. However, in some aspects, a transmitter may limit the selection of a precoding matrices based on a precoding weight set restriction when a single stream transmission is selected by the transmitter. Restricting the use of one or more precoding matrices may result in performance degradation due to the limited flexibility imposed in beamforming for single stream transmissions.

SUMMARY

Systems, methods, and apparatuses for balancing power output on the plurality of antennas for the transmission of a transport block (e.g., data blocks and/or overhead blocks) are disclosed. In accordance with the present disclosure, a transmitter may balance the power output on a plurality of transmit antennas in a multiple-input multiple-output (MIMO) system by having a precoded data block bypass a virtual antenna mapping of the overhead channels (e.g., control channels). Additionally or alternatively, the transmitter may balance the power output on the plurality of transmit antennas by applying an inverse mapping parameter during the precoding process to the data block to generate a plurality of inverse mapped precoded data blocks. In some examples, the inverse mapping parameter may be an inverse of the mapping parameter. Thus, in accordance with aspects of the present disclosure, precoding a data block may include selecting a precoding weight for each of the plurality of antennas from an unrestricted precoding weight set.

According to a first set of illustrative embodiments, a method of transmit power balancing in a multi-antenna wireless communication device is described. In some examples, the method may comprise receiving, at a base station, a data block for a single stream transmission of a data channel to user equipment (UE) and precoding the data block to generate a plurality of precoded data blocks each for transmission over a respective one of a plurality of antennas at the base station. The precoding may include selecting a precoding weight for each of the plurality of antennas from an unrestricted precoding weight set. In yet further aspects, the method may comprise balancing power output on the plurality of antennas for the transmission of the data block and transmitting the data block to the UE over the plurality of antennas.

According to a second set of illustrative embodiments, an apparatus for transmit power balancing in a multi-antenna wireless communication device is described. The apparatus may include means for receiving, at a base station, a data block for a single stream transmission of a data channel to user equipment (UE) and means for precoding the data block to generate a plurality of precoded data blocks each for transmission over a respective one of a plurality of antennas at the base station. The precoding may include selecting a precoding weight for each of the plurality of antennas from an unrestricted precoding weight set. In yet further aspects, the apparatus may comprise means for balancing power output on the plurality of antennas for the transmission of the data block and means for transmitting the data block to the UE over the plurality of antennas.

According to a third set of illustrative embodiments, another apparatus for transmit power balancing in a multi-antenna wireless communication device is described. The apparatus may include a data processing component configured to receive, at a base station, a data block for a single stream transmission of a data channel to user equipment (UE). In some examples, the apparatus may also include MIMO precoder configured to precode the data block to generate a plurality of precoded data blocks each for transmission over a respective one of a plurality of antennas at the base station. The precoding may include selecting a precoding weight for each of the plurality of antennas from an unrestricted precoding weight set. In yet further aspects, the apparatus may comprise a balancing configuration for balancing power output on the plurality of antennas for the transmission of the data block and a transmitter for transmitting the data block to the UE over the plurality of antennas.

According to a fourth set of illustrative embodiments, a computer-readable medium storing code for transmit power balancing in a multi-antenna wireless communication device is described. The computer-readable medium may include code comprising instructions executable to receive, at a base station, a data block for a single stream transmission of a data channel to user equipment (UE) and precode the data block to generate a plurality of precoded data blocks each for transmission over a respective one of a plurality of antennas at the base station. The precoding may include selecting a precoding weight for each of the plurality of antennas from an unrestricted precoding weight set. In yet further aspects, the code may comprise instructions for balancing power output on the plurality of antennas for the transmission of the data block and transmitting the data block to the UE over the plurality of antennas.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

The disclosed aspects of the present disclosure will hereinafter be described in conjunction with the appended drawings, provided to illustrate and not to limit the disclosed aspects, wherein like designations denote like elements, where a dashed line may indicate an optional component, and in which.

DETAILED DESCRIPTION

Various aspects are now described with reference to the drawings. In the following description, for purposes of explanation, numerous specific details are set forth to provide a thorough understanding of one or more aspects. It should be understood, however, that such aspect(s) may be practiced without these specific details. Also, as used herein, a component may be one of the parts that make up a system, may be hardware or software, and may be divided into other components.

As cellular networks have become more congested, operators are beginning to look at ways to maximize the use of available network resources. One approach to maximize the use of available network resources may include utilizing multi-antenna systems in wireless communications network to improve, for example, one or more of channel capacity, spectrum efficiency, system throughput, peak data rates, and link reliability. The multi-antenna systems are generally referred to as multiple-input multiple-output (MIMO) systems. In some MIMO examples, virtual antenna mapping (VAM) may be used to balance the input power to a plurality of power amplifies (PAs) in a MIMO transmitter. However, utilization of certain precoding control indicators (PCIs) associated with the VAM in MIMO single stream transmission may result in imbalanced power, and thus defeat the purpose of VAM. Some systems have attempted to address such drawback by applying precoding weight set restrictions that limit the use of a number of PCIs when a single stream is chosen by the UE. However, restricting the use of a number of PCIs may result in performance degradation.

In accordance with various aspects of the present disclosure, a transmitter (e.g., base station) may balance power output on the plurality of antennas for a single stream MIMO transmission of a transport block (e.g., data block and/or overhead block) by having a precoded data block bypass virtual antenna mapping. Additionally or alternatively, the transmitter may balance the power output on the plurality of transmit antennas for a single stream MIMO transmission of the data block by applying an inverse mapping parameter during the precoding process to the data block to generate a plurality of inverse mapped precoded data blocks. In some examples, the inverse mapping parameter may be an inverse of the mapping parameter implemented by a virtual antenna mapping component (see FIG. 2). Thus, in accordance with aspects of the present disclosure, precoding a data block may include selecting a precoding weight for each of the plurality of antennas from an unrestricted precoding weight set (infra).

Figure 1:
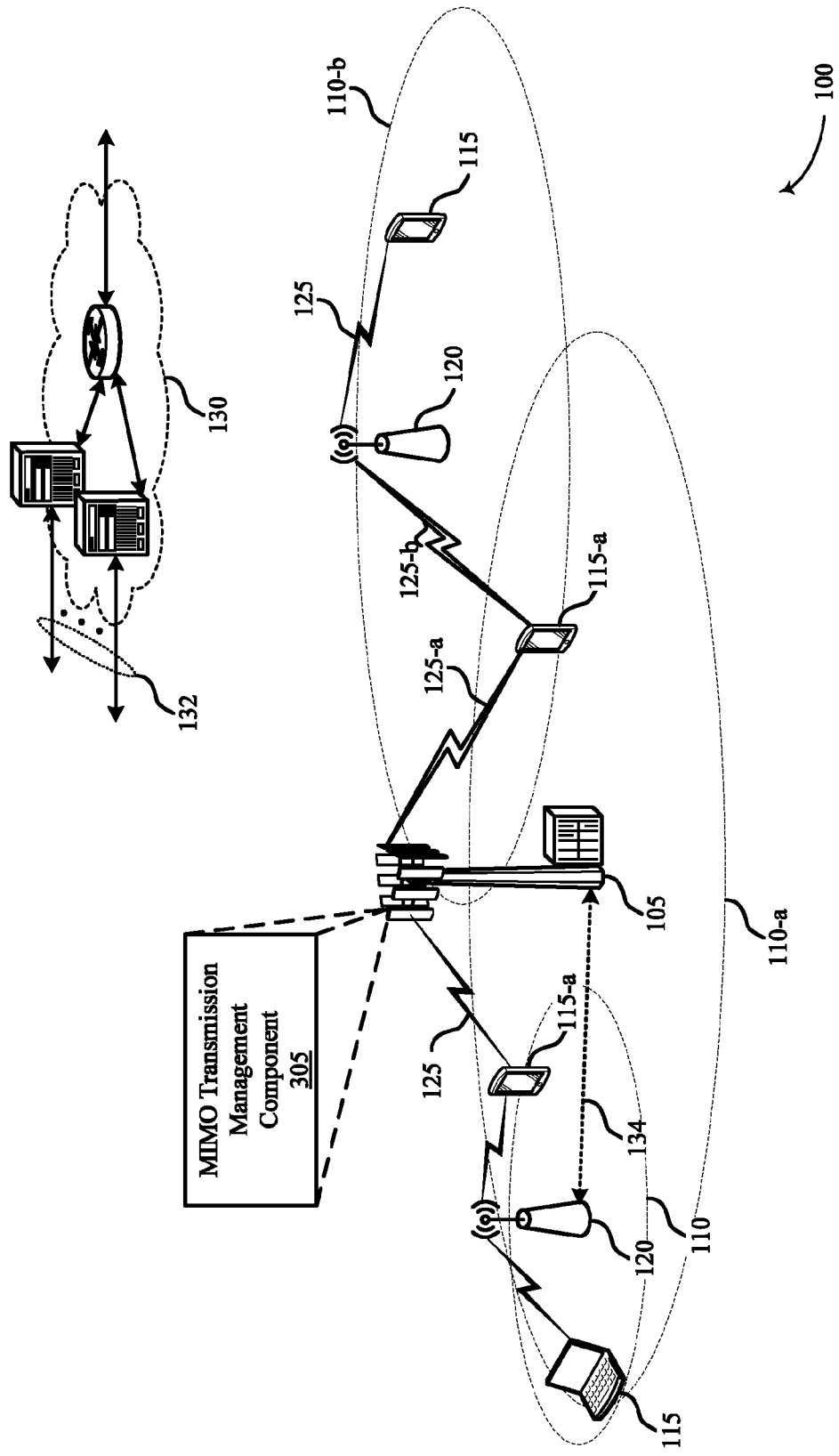
FIG. 1 is an example of a wireless communications system for balancing power output on the plurality of antennas for a single stream MIMO transmission, in accordance with various aspects of the present disclosure.

FIG. 1 is an example of a wireless communications system 100 including one or more base stations 105 configured for balancing power output over a plurality of antennas in a MIMO system in accordance with various aspects of the present disclosure. Besides base stations 105, the system 100 may include access points (AP) 120, mobile devices 115, and a core network 130. In some aspects of the present disclosure, the base station 105 may be referred to as a macro cell base station, and AP 120 may be referred to as small cell base station. The core network 130 may provide user authentication, access authorization, tracking, internet protocol (IP) connectivity, and other access, routing, or mobility functions. The base stations 105 interface with the core network 130 through backhaul links 132 (e.g., S1, etc.). The base stations 105 and AP 120 may perform radio configuration and scheduling for communication with the mobile devices 115, or may operate under the control of a base station controller (not shown). In various examples, the base station 105 and AP 120 may communicate, either directly or indirectly (e.g., through core network 130), with each other over backhaul links 134 (e.g., X2, Over-the-air (OTA) etc.), which may be wired or wireless communication links.

The base station 105 and AP 120 may wirelessly communicate with the mobile device 115 via one or more antennas. As noted above, mobile devices 115 may otherwise also be known as user equipment (UEs), or stations (STAs). Each of the base station 105 and AP 120 may provide communication coverage for a respective geographic coverage area 110. In some examples, base station 105 may be referred to as a base transceiver station, a radio base station, an access point, a radio transceiver, a NodeB, eNodeB (eNB), Home NodeB, a Home eNodeB, or some other suitable terminology. The geographic coverage area 110-a for a base station 105 and coverage area 110-b for AP 120 may be divided into sectors making up only a portion of the coverage area (not shown). The wireless communications system 100 may include base station 105 and AP 120 of different types (e.g., macro or small cell base stations). There may be overlapping geographic coverage areas 110 for different technologies.

In accordance with aspects of the present disclosure, one or more base stations 105 and/or AP 120 may be equipped with multiple ($N_T$) antennas that may be used for data transmission on the downlink channel and data reception on the uplink channel. Similarly, UEs 115 may be equipped with multiple ($N_R$) antennas that may be used for data transmission on the uplink channel and downlink reception on the downlink channel. Each antenna may be a physical antenna and/or a virtual antenna comprising an antenna array and an appropriate beamforming device. A MIMO transmission may be sent from the $N_T$ transmit antennas at the base station 105 to the $N_R$ receive antennas of the UE 115.

In some aspects, the base station 105 and/or AP 120 may receive data from a data source (not shown) for all scheduled UEs 115. Accordingly, the base station 105 may process (e.g., format, encode, interleave, and symbol map) that data for each UE 115 and provide data symbols, which are modulation symbols for data. In some examples, the base station 105 may also process signaling and provide signaling symbols, which are modulation symbols for signaling. A spatial mapper may precode the data symbols for each UE 115 based on a precoding matrix or vector selected by/for the UE 115 and provide output symbols. In some aspects, the base station 105 may utilize virtual antenna mapping (VAM) to balance the power output of a plurality of power amplifiers (PAs) across multiple antennas associated with the base station 105.

In some aspects, when UE 115 provides base station 105 with a PCI (based, at least in part, on a received signal from base station 105) that according to "3rd Generation Partnership Project" (3GPP) corresponds to a precoding weight set restrictions for a single stream MIMO transmission, aspects of the present disclosure include base station 105 executing a MIMO transmission management component 305 (See FIG. 2 and FIG. 3) configured to balance power output on the plurality of antennas for the single stream MIMO transmission by either having a precoded data block bypass virtual antenna mapping and/or by applying an inverse mapping parameter during the precoding process to the data block to generate a plurality of inverse mapped precoded data blocks. The inverse mapping parameter may be used by the base station 105 to proactively adjust for power imbalance caused by the virtual antenna mapping. In some aspects, a UE 115 may need to be notified of the modified virtual antenna mapping based on the inverse mapping parameter in order to allow the UE 115 to successfully demodulate the received signal from the base station 105. In some examples, the virtual antenna mapping matrix may be exchanged between the base station 105 and the UE 115 using control signals on the overhead channels. In other examples, the selected virtual antenna mapping matrix may be preconfigured at the UE 115 based on vendor-specific preferences.

In some aspects, a UE 115 may periodically determine the precoding matrix or vector, each corresponding to a respective PCI value that can provide the best performance (e.g., throughput) for downlink data transmission from the base station 105 to the UE 115 over communication links 125. For example, during each transmission time interval, the UE 115 may estimate the response of the wireless channel from the base station 105 to the UE 115. The UE 115 may then evaluate the performance of different hypotheses corresponding to different possible precoding matrices and vectors. For example, the UE 115 may determine the overall throughput for transmission of a dual stream or single stream transmission using variable PCI values. Based on the determination, the UE 115 may select and transmit a PCI value to the base station 105. In some examples, according to the present aspects, the PCI value may indicate a precoding weight set restriction according to 3GPP standards, however, according to the present aspects, base station 105 may instead use precoding weights from an unrestricted precoding weight set.

An unrestricted precoding weight set may comprise a set of precoding weights that avoid a precoding weight set restriction imposed by the 3GPP. For example, an unrestricted precoding weight set may comprise precoding MIMO weights $W_0$, $W_1$, $W_2$ and $W_3$. The precoding weights may be indicative of a plurality of precoding matrices and/or vectors that may be applied to one or more transport blocks for transmission from the base station 105 to the UE 115. In some aspects, when a base station 105 selects a single stream MIMO transmission for a transport block over a plurality of $N_T$ antennas, 3GPP recommends adoption of a virtual antenna mapping matrix with restricted weight selection (e.g., $W_0$ and $W_3$ may not be used) to balance the power of the power amplifiers. However, aspects of the present disclosure avoid imposition of such precoding weight set restriction and make all precoding weights available for selection by the base station 105. Thus, in some examples, the base station 105 may precode a data block by selecting any one or more of the precoding weights from the unrestricted precoding weight set ($W_0$, $W_1$, $W_2$ and $W_3$) without restraint.

In some examples, the wireless communications system 100 includes a wireless wide area network (WWAN) such as an LTE/LTE-Advanced (LTE-A) network. In LTE/LTE-A networks, the term evolved node B (eNB) may be generally used to describe the base stations 105, while the term user equipment (UEs) may be generally used to describe the mobile devices 115. The wireless communications system 100 may include a heterogeneous LTE/LTE-A network in which different types of eNBs provide coverage for various geographical regions. The wireless communications system 100 may, in some examples, also support a wireless local area network (WLAN). A WLAN may be a network employing techniques based on the Institute of Electrical and Electronics Engineers (IEEE) 802.11 family of standards ("Wi-Fi"). In some examples, each eNB or base station 105 and AP 120 may provide communication coverage for a macro cell, a small cell, or other types of cell. The term "cell" is a 3GPP term that can be used to describe a base station, a carrier or component carrier associated with a base station, or a coverage area (e.g., sector, etc.) of a carrier or base station, depending on context.

A macro cell generally covers a relatively large geographic area (e.g., several kilometers in radius) and may allow unrestricted access by mobile device 115 with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by mobile device 115 with service subscriptions with the network provider. A femto cell may also cover a small geographic area (e.g., a home) and may provide restricted access by mobile device 115 having an association with the femto cell (e.g., mobile device 115 in a closed subscriber group (CSG), mobile device 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers). In some aspects of the present disclosure, the base station 105 may be referred to as a macro cell base station, and AP 120 may be referred to as small cell base station.

The mobile devices 115 may be dispersed throughout the wireless communications system 100, and each mobile device 115 may be stationary or mobile. A mobile device 115 may also include or be referred to by those skilled in the art as a user equipment (UE), mobile station, a subscriber station, STA, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A mobile device 115 may be a cellular phone, a personal digital assistant (PDA), a wireless modem, a wireless communication device, a handheld device, a tablet computer, a laptop computer, a cordless phone, a wireless local loop (WLL) station, or the like. A mobile device may be able to communicate with various types of base stations and network equipment including macro eNBs, small cell eNBs, relay base stations, and the like. In some examples, a dual-radio UE 115-a, may include a WLAN radio (not shown) and a WWAN radio (not shown) that may be configured to concurrently communicate with base station 105 (using the WWAN radio) and with AP 120 (using the WLAN radio) over communication links 125-a and 125-b respectively.

Wireless communications system 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A mobile device 115 may be configured with multiple downlink CCs and one or more uplink CCs for carrier aggregation. Carrier aggregation may be used with both FDD and TDD component carriers.

Figure 2A:
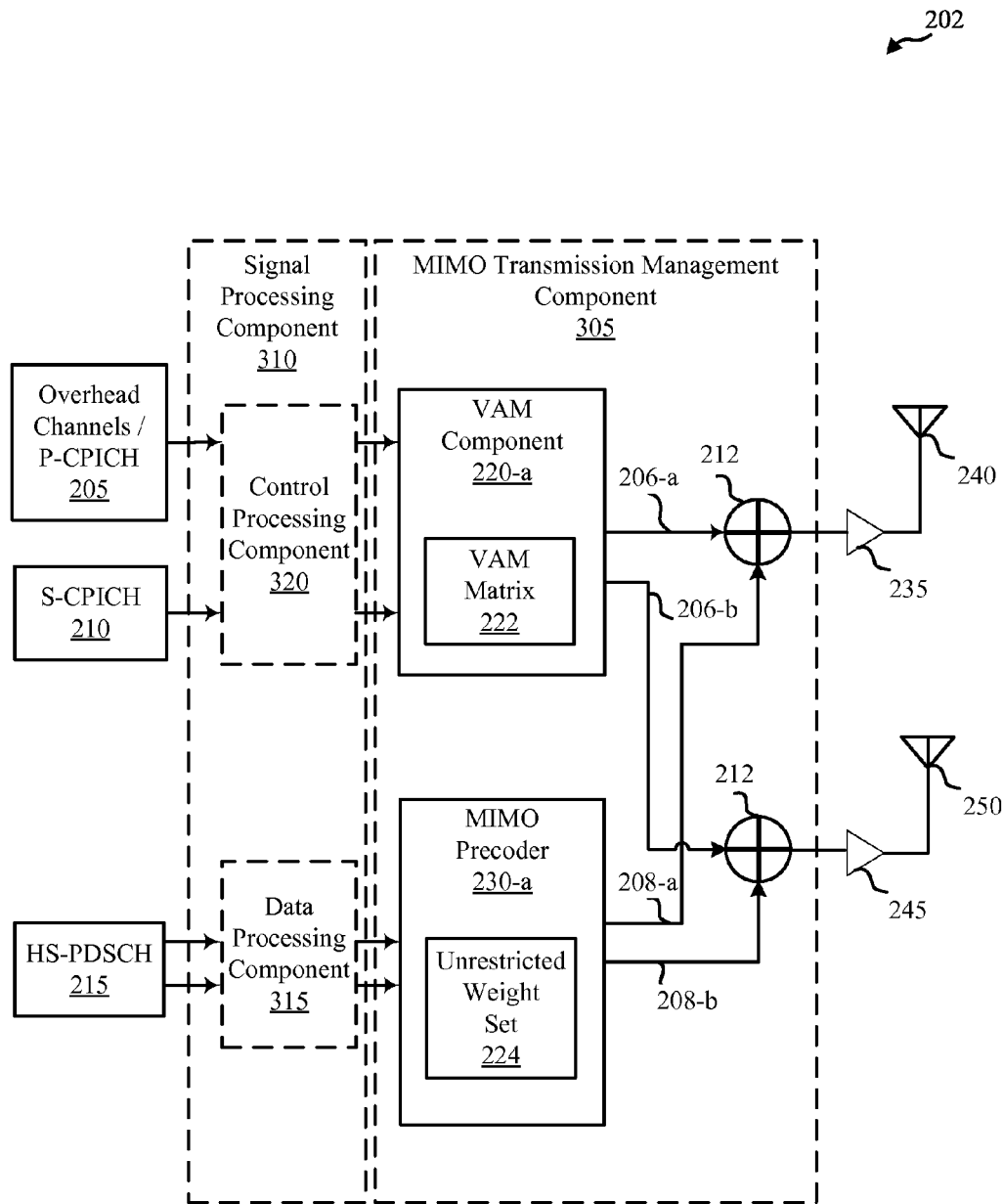
FIG. 2A is one example of a MIMO system implemented in a transmitter for balancing the power output on a plurality of transmit antennas for a single stream MIMO transmission by having a precoded data block bypass virtual antenna mapping in accordance with various aspects of the present disclosure.

FIG. 2A illustrates one example of a part of a MIMO transmission system 202 at a base station 105 having a MIMO transmission management component 305 implemented in a transmitter (e.g., base station 105 and/or AP 120) for balancing the power output on a plurality of transmit antennas 240 and 250 for a single stream MIMO transmission by having a precoded data block bypass a virtual antenna mapping component 220-a.

In some examples, the MIMO transmission system 202 may include, in relevant part, a signal processing component 310 (See FIG. 3) to process one or more transport blocks (e.g., data blocks and overhead blocks) in a multi-antenna system. For example, the signal processing component 310 may include a data processing component 315 (See FIG. 3) for processing one or more data blocks for a single stream transmission to the UE 115 over a plurality of antennas from a high-speed physical downlink shared channel (HS-PDSCH) 215, and a control processing component 320 (See FIG. 3) for processing at least one overhead block from one or more overhead channels that may include at least one of a primary common pilot channels (P-CPICH) 205, secondary common pilot channels (S-CPICH) 210, a primary common control physical channel (P-CCPCH), or other channels (individually and collectively referred to as "overhead channels") that includes control information associated with the data channel. Thus, in some aspects, the data processing component 315 and the control processing component 320 may receive one or more transport blocks from a data source, format, code, and interleave the traffic data for each data stream based on a particular coding scheme selected for that data stream to provide coded data. Further, in an aspect, signal processing component 310 may multiplex the coded data for each data stream with pilot data using OFDM techniques. The pilot data is typically a known data pattern that is processed in a known manner and may be used at the receiver system to estimate the channel response. The multiplexed pilot and coded data for each data stream is then modulated (e.g., symbol mapped) based on a particular modulation scheme (e.g., BPSK, QSPK, M-PSK, or M-QAM) selected for that data stream to provide modulation symbols. Further, in an aspect, signal processing component 310 may forward the modulation symbols of the transport blocks to the VAM component 220 and/or MIMO precoder 230 respectively.

In accordance with aspects of the present disclosure, data representing one or more P-CPICH 205, S-CPICH 210 and/or other overhead channels may be passed through a VAM component 220-a to generate a plurality of mapped overhead blocks 206, which may be subsequently summed 212 with a plurality of precoded data blocks 208 generated by a MIMO precoder 230-a by precoding a data block for a HS-PDSCH 215, thereby forming at least two transmission streams of modulation symbols, each for transmission to the UE 115 over a corresponding number (e.g., a plurality) of physical antennas 240 and 250. In some aspects, VAM component 220-a may be configured to balance the power output for overhead blocks between the first power amplifier 235 and the second power amplifier 245 associated with the first antenna 240 and second antenna 250 respectively.

In some examples, VAM component 220-a may receive at least one overhead block for at least one overhead channel. The overhead block may include control information associated with the data channel 215. Accordingly, VAM component 220-a may map the overhead blocks from the overhead channels (e.g., P-CPICH 205 and/or S-CPICH 210, P-CCPCH, etc.) onto physical antennas utilizing one or more VAM weights of a VAM matrix 222 for each path. VAM component 220-a may include, for example, a matrix of four VAM weights (e.g., $P_0$, $P_1$, $P_2$, and $P_3$) that are different from the MIMO precoding weights discussed in reference to FIG. 1. For example, the VAM weights may be fixed at a cell level and applied across all physical channels of the cell. In contrast, the MIMO weights may be selected individually for each MIMO UE 115 and applied to physical channels associated only with the specific UE 115. Thus, in some examples, the VAM component 220-a may balance power across a plurality of paths and antennas 240 and 250 by using phase and amplitude coefficients associated with the VAM weights such that the power amplifiers 235 and 245 are optimally used to transmit the one or more mapped overhead blocks 206 to the UE 115.

Additionally or alternatively, a MIMO precoder 230-a may be configured to precode a data block for a HS-PDSCH 215 to generate the plurality of precoded data blocks 208 for transmission over a respective one of a plurality of antennas 240 and 250. In some examples, precoding the data blocks may include selecting a precoding weight for each of the plurality of antennas from an unrestricted precoding weight set 224. As discussed above, an unrestricted precoding weight set 224 may comprise a set of precoding weights that avoid a precoding weight set restriction imposed by the 3GPP (e.g., even though the PCI from the UE may indicate a restricted set, the base station may utilize the full set). For example, an unrestricted precoding weight set 224 may comprise precoding weights $W_0$, $W_1$, $W_2$ and $W_3$. Generally, when a base station 105 selects a single stream transmission for a transport block over a plurality of $N_T$ antennas, 3GPP recommends adoption of a virtual antenna mapping matrix with restricted weight selection (e.g., $W_0$ and $W_3$ may not be used) to balance the power for a plurality of antennas. However, aspects of the present disclosure avoid imposition of such precoding weight set restrictions and make all precoding weights available for selection by the base station 105 during a single stream transmission in a MIMO system. Thus, in some examples, the MIMO precoder 230-a may precode a data block by selecting any one of the precoding weights from the unrestricted precoding weight set 224 ($W_0$, $W_1$, $W_2$ and $W_3$) without restraint. In some aspects, precoding weights may be used as part of the MIMO transmission chain defined in 3GPP (see TS 25.214) and selected individually for each transmission by the base station 105.

Accordingly, in some aspects, the plurality of mapped overhead blocks 206 may be summed 212 with the respective plurality of precoded data blocks 208 prior to being forwarded to the first power amplifier 235 and the second power amplifier 245 for transmission over the first antenna 240 and the second antenna 250. However, as illustrated in FIG. 2A, the plurality of precoded data block(s) 208 bypass the VAM component 220-a prior to being summed 212 with the respective mapped overhead blocks 206. By allowing the precoded data blocks 208 to bypass the VAM component 220-a, this configuration of MIMO transmission management component 305 of the MIMO transmission system 202 may not be restrained to the precoding weight set restrictions imposed by the 3GPP without compromising the balanced power output over the plurality of antennas 240 and 250.

Figure 2B:
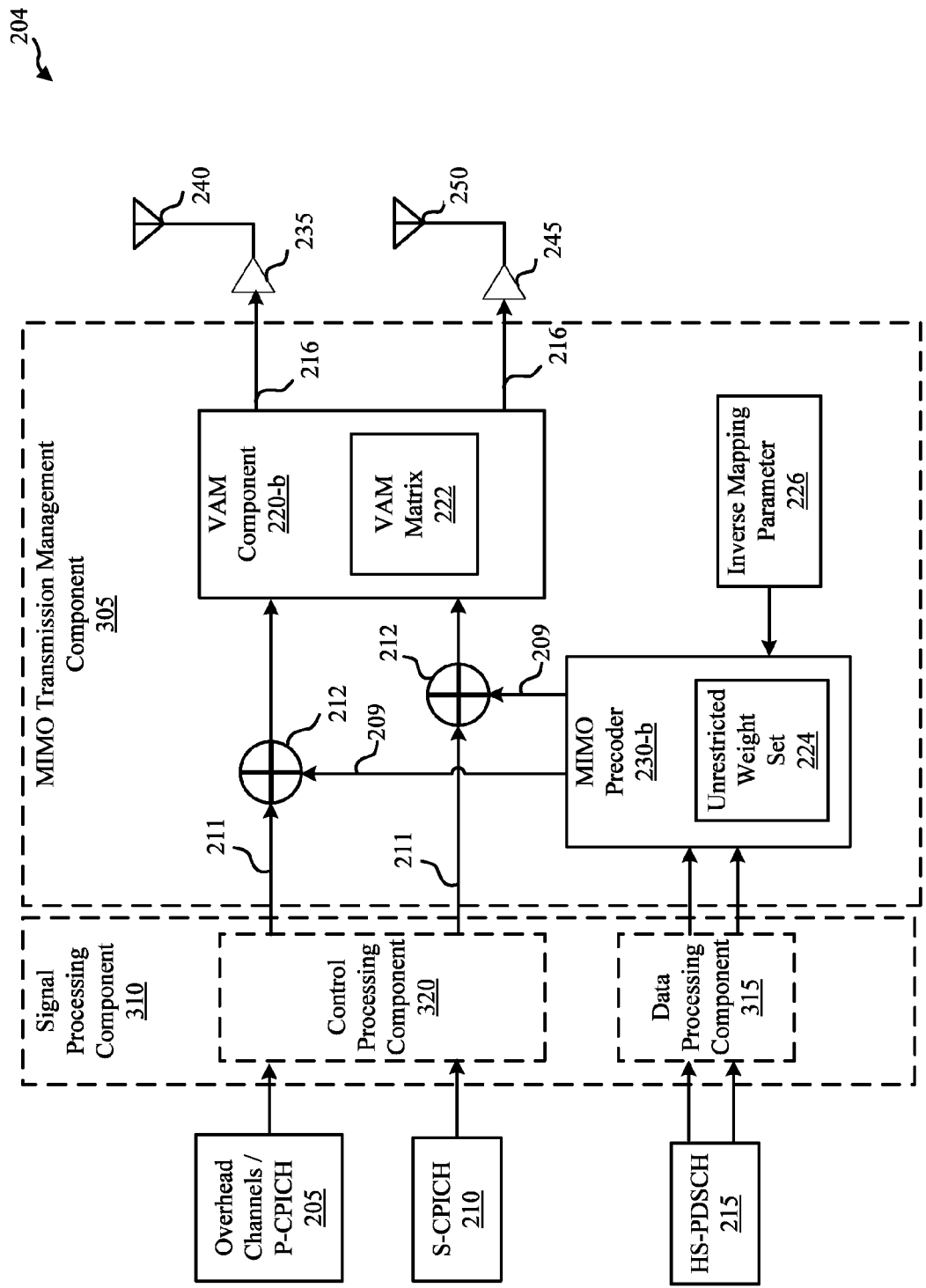
FIG. 2B is another example of a MIMO system implemented in a transmitter for balancing the power output on a plurality of transmit antennas for a single stream MIMO transmission by applying an inverse mapping parameter during the precoding process to the data block in accordance with various aspects of the present disclosure.

Additionally or alternatively, FIG. 2B illustrates another example of a MIMO transmission system 204 at a base station 105 having a MIMO transmission management component 305 implemented in a transmitter (e.g., base station 105 and/or AP 120) for balancing the power output on a plurality of transmit antennas 240 and 250 for a single stream MIMO transmission by applying an inverse mapping parameter 226 during the precoding process to the data block to generate a plurality of inverse mapped precoded data blocks.

As discussed above, in some examples, the MIMO transmission system 204 may also include a signal processing component (not shown) to process one or more transport blocks (e.g., data blocks and overhead blocks) in a multi-antenna system. For example, the signal processing component may include a data processing component 315 (See FIG. 3) for processing one or more data blocks for a single stream transmission to the UE 115 over a plurality of antennas from a HS-PDSCH 215, and a control processing component 320 (See FIG. 3) for processing at least one overhead block from one or more overhead channels (e.g., P-CPICH 205, S-CPICH 210, P-CCPCH, etc.) that include control information associated with the data channel HS-PDSCH 215. Thus, in some aspects, the data processing component 315 and the control processing component 320 may receive one or more transport blocks from a data source and forward the transport blocks to the VAM component 220 and/or MIMO precoder 230 respectively.

In accordance with the aspects of the present disclosure, the data blocks associated with HS-PDSCH 215 may be precoded by the MIMO precoder 230-b by applying a precoding weight for each of the plurality of antennas 240 and 250 from an unrestricted precoding weight set 224. Additionally or alternatively, the MIMO precoder 230-b may apply an inverse mapping parameter 226 during the precoding in order to proactively adjust for the power imbalance that may result from virtual antenna mapping. In some aspects, the inverse mapping parameter 226 may be predefined between the base station 105 and the UE 115. In other examples, the inverse mapping parameter 226 may be dynamically adjusted based on feedback received from the UE 115. For example, based on the information received from the UE 115, the MIMO precoder 230-b of the base station 105 may adjust the inverse mapping parameter 226 to insure balanced output of a single stream transmission over the plurality of antennas 240 and 250.

Subsequently, overhead blocks 211 associated with the overhead channels (e.g., P-CPICH 205, S-CPICH 210, P-CCPCH, etc.) may be summed 212 with respective inverse mapped precoded data blocks 209 associated with the HS-PDSCH 215 prior to applying the virtual antenna mapping at the VAM component 220-b to both the overhead blocks 211 and the inverse mapped precoded data blocks 209. The VAM component 220-b may map one or more transport blocks (e.g., overhead blocks and data blocks) onto the physical antennas 240 and 250 utilizing one or more VAM weights of a VAM matrix 222 for each path. Accordingly, this configuration of the MIMO transmission system 204 comprises a MIMO transmission management component 305 that includes a MIMO precoder 230-b for applying the inverse mapping parameter 226, and VAM component 220-b for applying virtual antenna mapping to balance the power output across a plurality of paths and antennas 240 and 250 by using phase and amplitude coefficients associated with the VAM weights of VAM matrix 222 such that the power amplifiers 235 and 245 are optimally used to transmit the one or more transport blocks to the UE 115.

Figure 3:
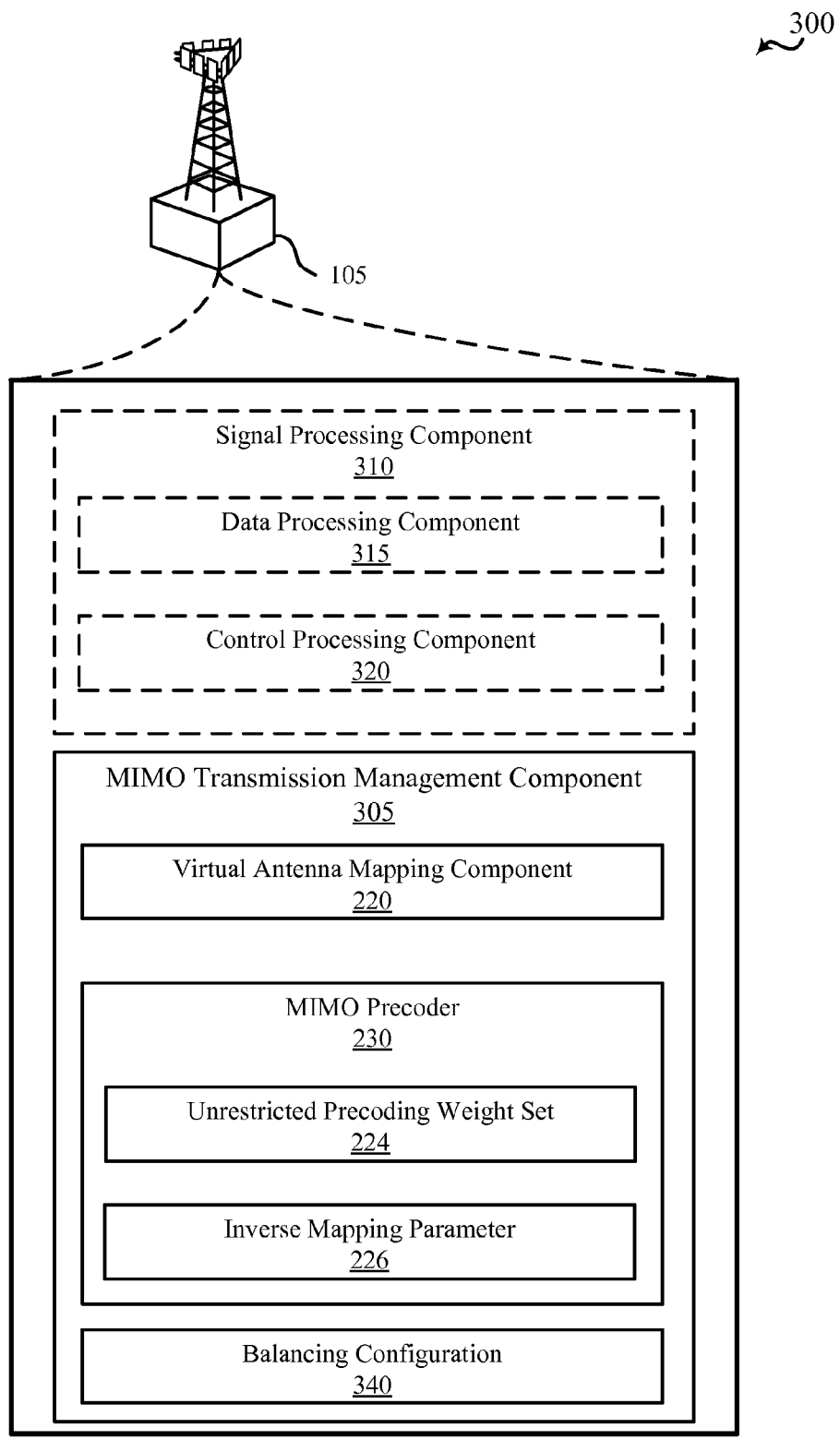
FIG. 3 is an example of a schematic diagram of a base station comprising components and sub-components configured to implement various aspects of the present disclosure.

FIG. 3 shows a block diagram 300 of a base station 105 comprising a MIMO transmission management component 305 configured to execute aspects of the present disclosure. The MIMO transmission management component 305 (and any of its subcomponents) may be implemented in hardware, such as in one or more specifically programmed processor modules, or in software as one or more computer executable codes stored in a computer readable medium and executable by a processor, or some combination thereof (e.g., firmware).

In some examples, the MIMO transmission management component 305 may operate in communication with a signal processing component 310 to process one or more transport blocks (e.g., data blocks and overhead blocks) in a multi-antenna system. For example, the signal processing component 310 may include a data processing component 315 for processing one or more data blocks for a single stream transmission to the UE 115 over a plurality of antennas, and a control processing component 320 for processing at least one overhead block for an overhead channel that includes control information associated with the data channel. The data processing component 315 and the control processing component 320 may be an example of data processing component and control processing component described with reference to FIG. 2.

Additionally or alternatively, the MIMO transmission management component 305 may include a MIMO precoder 230 for precoding the data block to generate a plurality of precoded data blocks, each for transmission over a respective one of a plurality of antennas at the base station 105. In some examples, the precoding may include selecting a precoding weight for each of the plurality of antennas from an unrestricted weight set (supra). In other alternative examples, the MIMO precoder 230 may apply an inverse mapping parameter 226 during the precoding to the data block, or after the precoding to each of the plurality of precoded data blocks, to generate a plurality of inverse mapped precoded data blocks. The inverse mapping parameter 226 may be an inverse of the mapping parameter. In some aspects, the MIMO precoder 230 may include an unrestricted precoding weight set 224. The unrestricted precoding weight set 224 may comprise a set of precoding weights that avoid a precoding weight set restriction imposed by the 3GPP associated with a received PCI for single stream MIMO transmissions.

In yet further examples, the MIMO transmission management component 305 may include a virtual antenna mapping component 220. The virtual antenna mapping component 220 may be an example of VAM component 220 described with reference to FIGS. 2A and 2B. The virtual antenna mapping component 220 may apply virtual antenna mapping to the at least one overhead block for at least one overhead channel. In some examples, the overhead block may include control information associated with the data channel. Additionally or alternatively, virtual antenna mapping component 220 may apply a virtual antenna mapping to a plurality of precoded data blocks, including a plurality of inverse mapped precoded data blocks to generate a plurality of inverse mapped precoded data blocks.

In some aspects, the at least one overhead channel may include a common pilot channel (CPICH) associated with the base station 105. The CPICH may comprise at least one of a primary common pilot channel (P-CPICH) or a second common pilot channel (S-CPICH). The at least one overhead channel may additionally include P-P-CCPCH, or other channels associated with control information. The data channel may comprise a high-speed physical downlink shared channel (HS-PDSCH).

In yet further example, the MIMO transmission management component 305 may include a balancing configuration 340 for balancing the power output of the plurality of antennas for the transmission of the data blocks and the overhead blocks. In some aspects, the balancing configuration 340 may represent the relative structure of VAM component 220-a or 220-b and MIMO precoder 230-a or 230-b, in combination with the routing of their respective input and output data streams, as illustrated in FIGS. 2A and 2B. For example, the balancing configuration 340 may balance the power output by having the plurality of precoded data blocks bypass virtual antenna mapping associated with the virtual antenna mapping component 220. In other examples, the balancing configuration 340 may balance the power output of the plurality of antennas by applying an inverse mapping parameter 226 during the precoding to the data blocks to generate a plurality of inverse mapped precoded data blocks that are subsequently processed by the virtual antenna mapping component 220 by applying a virtual antenna mapping to the plurality of inverse mapped precoded data blocks.

Figure 4:
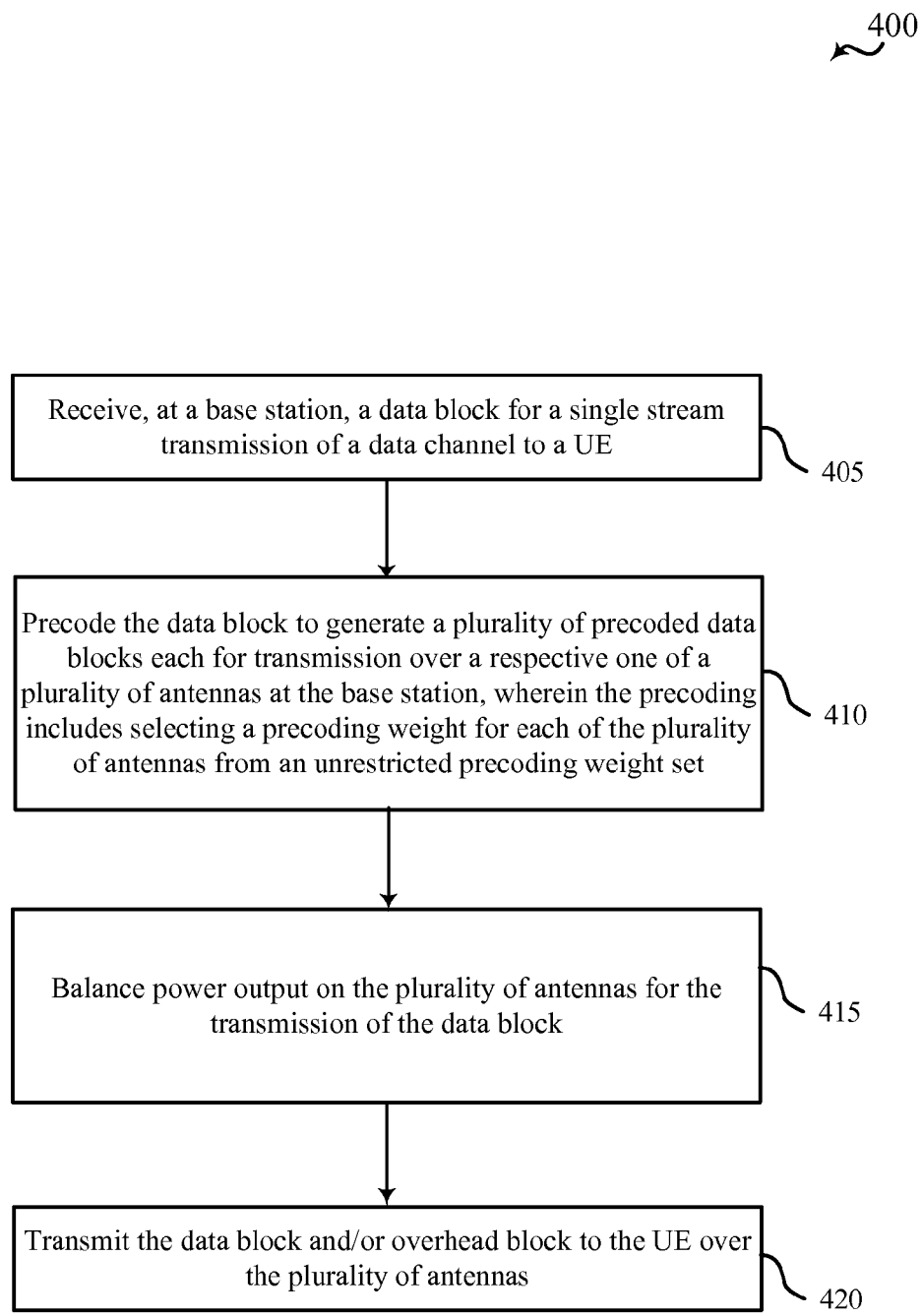
FIG. 4 is a flowchart of one example for balancing power output on a plurality of transmit antennas for a single stream MIMO transmission in accordance with various aspects of the present disclosure.

FIG. 4 is a flowchart conceptually illustrating an example of a method 400 for power balancing in a multi-antenna wireless communication device, in accordance with aspects of the present disclosure. For clarity, the method 400 is described below with reference to ones of the base stations 105 and/or access points 120, described with reference to FIGS. 1-3.

At block 405, the method 400 may include receiving, at a base station, a data block for a single stream transmission of a data channel to a UE 115. Aspects of block 405 may be performed by base station 105 or signal processing component 310 and/or MIMO transmission management component 305 described with reference to FIGS. 1-3. In some examples, the data processing component 315 of signal processing component 310 may receive one or more data blocks associated with a high-speed physical downlink shared channel (HS-PDSCH), process the data, and forward the data blocks in the form of modulation symbols to MIMO precoder 230 for processing. Alternatively, in another example, MIMO precoder 230 of MIMO transmission management component 305 may receive the data blocks in the form of modulation symbols, e.g., from signal processing component 310.

At block 410, the method 400 may include precoding the data block to generate a plurality of precoded data blocks, each for transmission over a respective one of a plurality of antennas at the base station. In some examples, for example, base station 105 or MIMO transmission management component 305 or MIMO precoder 230 may precode the data blocks, which may include selecting a precoding weight for each of the plurality of antennas from an unrestricted precoding weight set. The unrestricted precoding weight set may comprise a set of precoding weights that avoid a precoding weight set restriction imposed by the 3GPP. Thus, in some examples, the MIMO precoder 230 may precode a data block by selecting any one of the precoding weights from the unrestricted precoding weight set without restraint and generate a plurality of precoded data blocks. Additionally or alternatively, the MIMO precoder 230, at block 410, may precode the data blocks associated with HS-PDSCH by applying an inverse mapping parameter during the precoding process in order to proactively adjust for the power imbalance that may result from virtual antenna mapping. The actions associated with the configuration of MIMO transmission management component 305 that includes applying an inverse mapping parameter are described below in more detail with reference to FIG. 5B.

At block 415, the method 400 may include balancing power output on the plurality of antennas for the transmission of the data block. In one example configuration, base station 105 or MIMO transmission management component 305 may balance the power output on the plurality of antennas by having the plurality of precoded data blocks bypass a virtual antenna mapping, as illustrated in the structure of FIG. 2A. The actions associated with the configuration of MIMO transmission management component 305 that includes bypassing the virtual antenna mapping are described below in more detail with reference to FIG. 5A. In another example, balancing the power output may comprise applying an inverse mapping parameter during the precoding of the data blocks to generate a plurality of inverse mapped precoded data block as illustrated in the structure of FIG. 2B. As noted, above, the actions associated with the configuration of MIMO transmission management component 305 that includes applying an inverse mapping parameter are described below in more detail with reference to FIG. 5B.

At block 420, the method 400 may include transmitting the data block and/or overhead block, when applicable, to the UE over the plurality of antennas. Aspects of block 420 may be performed by base station 105 or MIMO transmission management component 305 as described with reference to FIGS. 1-3 and 6. In some aspects, e.g., where the configuration of MIMO transmission management component 305 includes bypassing the virtual antenna mapping, the transmitting the data block and/or overhead blocks may include transmitting a sum of a respective one of the plurality of precoded data blocks, after bypassing the virtual antenna mapping, and a respective one of the plurality of mapped overhead blocks over a respective one of the plurality of antennas. In other aspects, e.g., where the configuration of MIMO transmission management component 305 includes applying an inverse mapping parameter, the transmitting may include transmitting a sum of a respective one of the plurality of precoded data blocks, subsequent to the applying of the virtual antenna mapping, and a respective one of the plurality of mapped overhead blocks over a respective one of the plurality of antennas.

Figure 5A:
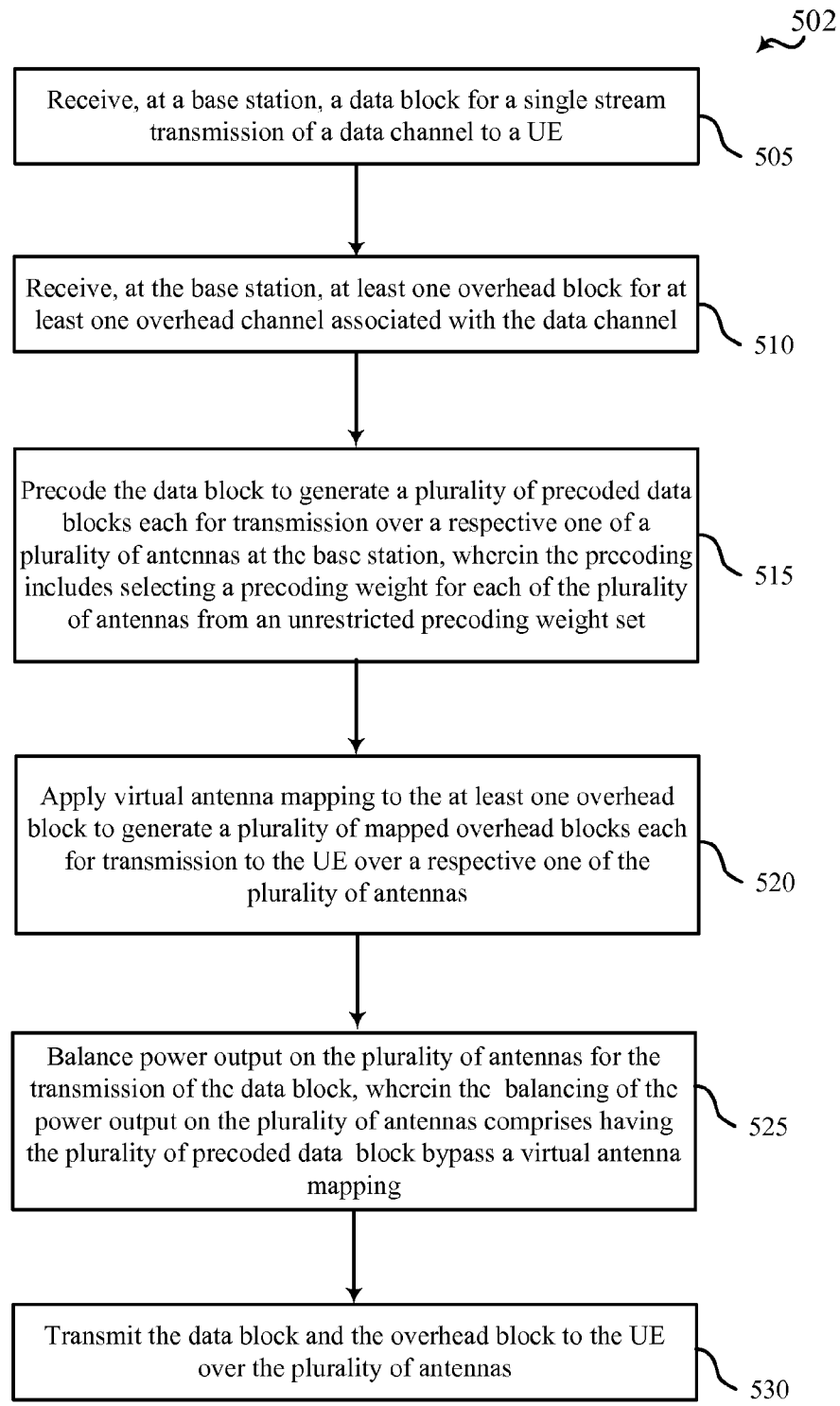
FIG. 5A is a flowchart of one example for balancing power output on a plurality of transmit antennas for a single stream MIMO transmission by having a precoded data block bypass virtual antenna mapping in accordance with aspects of the present disclosure.

FIG. 5A is a flowchart conceptually illustrating an example of a method 502 of balancing power output on a plurality of transmit antennas for a single stream MIMO transmission by having a precoded data block bypass virtual antenna mapping in accordance with aspects of the present disclosure. For clarity, the method 502 is described below with reference to ones of the base stations 105 and/or access points 120, described with reference to FIGS. 1-3. The method 502 of FIG. 5A describes one configuration-specific implementation of the method 400 of FIG. 4, e.g., where the configuration of MIMO transmission management component 305 includes bypassing the virtual antenna mapping.

At block 505, the method 502 may include receiving, at a base station, a data block for a single stream transmission of a data channel to a UE. Aspects of block 505 may be performed as described above with respect to block 405 of FIG. 4.

At block 510, the method 502 may include receiving, at the base station, at least one overhead block for at least one overhead channel associated with the data channel. Aspects of block 510 may be performed by base station 105 or signal processing component 310 and/or control processing component 320 and/or MIMO transmission management component 305 as described with reference to FIG. 2A and FIG. 3. In an aspect, for example, control processing component 320 of signal processing component 310 may receive at least one overhead block from one or more primary common pilot channels (P-CPICH) 205 and/or secondary common pilot channels (S-CPICH) 210 (individually and collectively referred to as "overhead channels") that includes control information associated with the data channel, process the control information, and forward the control information in the form of modulation symbols to the VAM component 220-a of MIMO transmission management component 305 for processing. Alternatively, in another example, VAM component 220-a of MIMO transmission management component 305 may receive the control information in the form of modulation symbols, e.g., from signal processing component 310.

At block 515, the method 502 may include precoding the data block to generate a plurality of precoded data blocks each for transmission over a respective one of a plurality of antennas at the base station. In some examples, base station 105 or MIMO transmission management component 305 or the MIMO precoder 230-a may be configured for precoding the data blocks may include selecting a precoding weight for each of the plurality of antennas from an unrestricted precoding weight set, as described with respect to block 410 of FIG. 4 and elsewhere herein.

At block 520, the method 502 may include applying virtual antenna mapping to the at least one overhead block to generate a plurality of mapped overhead blocks each for transmission to the UE over a respective one of the plurality of antennas. Aspects of block 520 may be performed by base station 105 or MIMO transmission management component 305 or virtual antenna mapping (VAM) component 220-a described with reference to FIG. 3. For instance, the VAM component 220-a may map the overhead blocks from the P-CPICH 205 and/or S-CPICH 210 onto the physical antennas utilizing one or more VAM weights of a VAM matrix 222 for each path.

At block 525, the method 502 may including balancing power output on the plurality of antennas for the transmission of the data block. In one aspect, base station 105 or MIMO transmission management component 305 may be configured for balancing the power output on the plurality of antennas, such as by being setup in a configuration such that the plurality of precoded data blocks from the MIMO precoder 230-a bypass a virtual antenna mapping, as illustrated in structure of FIG. 2A.

At block 530, the method 502 may include transmitting the data block and/or overhead block, when applicable, to the UE over the plurality of antennas. Aspects of block 530 may be performed by base station 105 or MIMO transmission management component 305 described with reference to block 420 of FIG. 4, and further with reference to FIGS. 1-3 and 6. In some aspects, base station 105 or MIMO transmission management component 305 may transmit the data block and/or overhead blocks to UE 115 by transmitting a sum of a respective one of the plurality of precoded data blocks, after bypassing the virtual antenna mapping, and a respective one of the plurality of mapped overhead blocks over a respective one of the plurality of antennas, e.g., antennas 240 and 250.

Accordingly, in an aspect referring to FIG. 2A, the plurality of mapped overhead blocks 206 may be summed 212 with the respective plurality of precoded data blocks 208 prior to being forwarded to the first power amplifier 235 and the second power amplifier 245 for transmission over the first antenna 240 and the second antenna 250. However, as illustrated in FIG. 2A, the plurality of precoded data block(s) 208 bypass the VAM component 220-*a* prior to being summed 212 with the respective mapped overhead blocks 206. By allowing the precoded data blocks 208 to bypass the VAM component 220-*a*, this configuration of the MIMO transmission system 202 may not be restrained to the precoding weight set restrictions imposed by the 3GPP without compromising the balanced power output over the plurality of antennas 240 and 250.

Figure 5B:
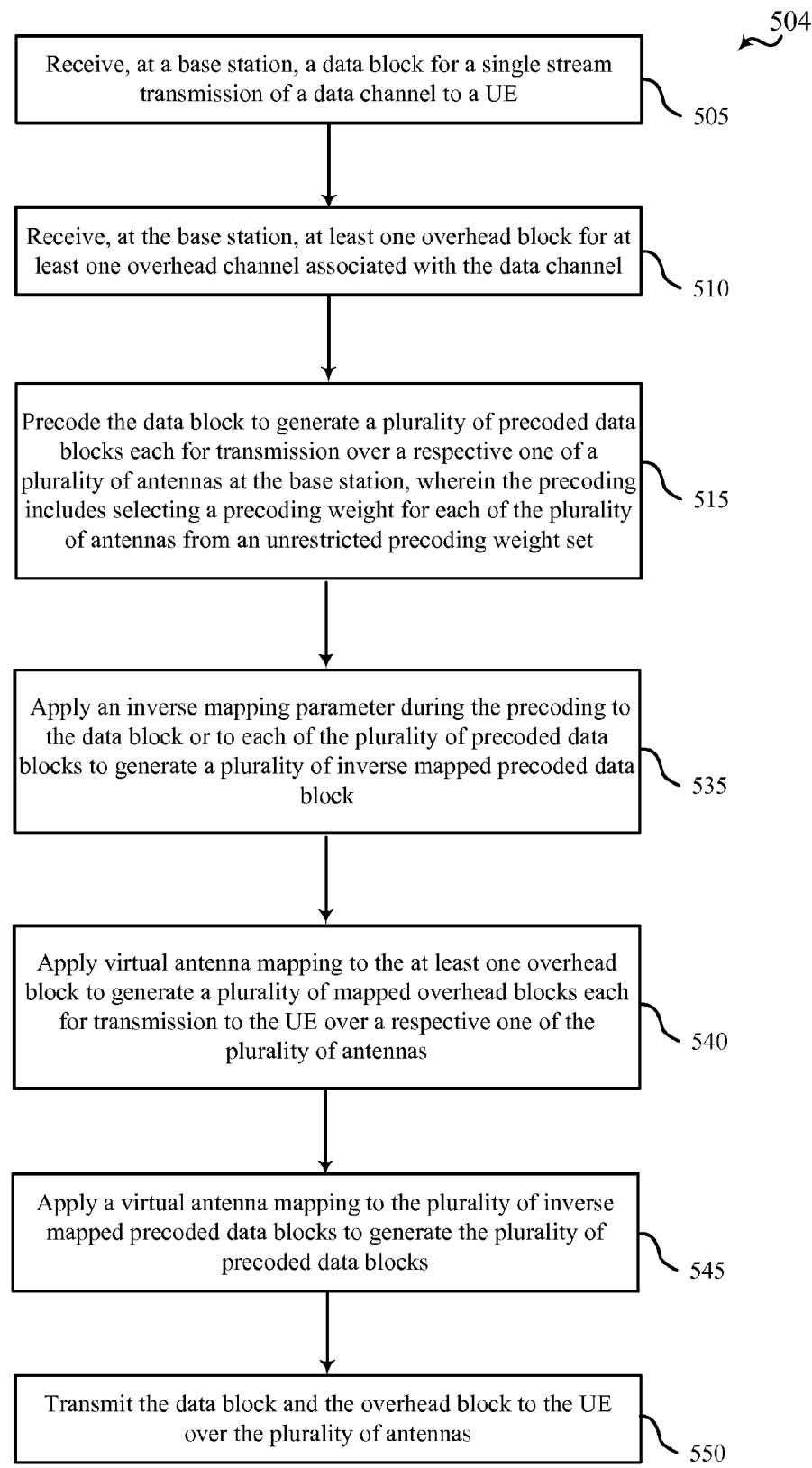
FIG. 5B is a flowchart of another example for balancing power output on a plurality of transmit antennas for a single stream MIMO transmission by applying an inverse mapping parameter during the precoding process to the data block in accordance with various aspects of the present disclosure.

FIG. 5B is a flowchart conceptually illustrating another example of a method 504 of wireless communication for balancing power output on a plurality of transmit antennas for a single stream MIMO transmission by applying an inverse mapping parameter during the precoding process to the data block in accordance with various aspects of the present disclosure. For clarity, the method 504 is described below with reference to ones of the base stations 105 and/or access points 120, described with reference to FIGS. 1-3. In some examples, blocks 505-515 may be similar to those described with reference to FIG. 5A. Also, the method 504 of FIG. 5B describes one configuration-specific implementation of the method 400 of FIG. 4, e.g., where the configuration of MIMO transmission management component 305 includes applying an inverse mapping parameter during the precoding process.

At block 505, the method 504 may include receiving, at a base station, a data block for a single stream transmission of a data channel to a UE. Aspects of block 505 may be performed as described above with respect to block 405 of FIG. 4.

At block 510, the method 504 may include receiving, at the base station, at least one overhead block for at least one overhead channel associated with the data channel. Aspects of block 510 may be performed in a similar manner as described above with respect to block 510 of FIG. 5A, except with particular reference to the structure of FIG. 2B, e.g., with respect to forwarding the control information to the VAM component 220-*b* for processing.

At block 515, the method 504 may precode the data block to generate a plurality of precoded data blocks each for transmission over a respective one of a plurality of antennas at the base station 105. Precoding the data block may include selecting a precoding weight for each of the plurality of antennas from an unrestricted precoding weight set. Aspects of block 515 may be performed by MIMO transmission management component 305 or MIMO precoder 230-*b* described with reference to FIG. 2B.

At block 535, the method 504 may apply an inverse mapping parameter during the precoding to the data block, or to each of the plurality of precoded data blocks, to generate a plurality of inverse mapped precoded data blocks. In some examples, MIMO transmission management component 305 or MIMO precoder 230-*b* may apply an inverse mapping parameter 226 during or after the precoding in order to proactively adjust for the power imbalance that may result from virtual antenna mapping performed by VAM component 220-*b*. In some aspects, the inverse mapping parameter 226 may be predefined between the base station 105 and the UE 115. In other examples, the inverse mapping parameter 226 may be dynamically adjusted based on feedback received from the UE 115. For example, based on the information received from the UE 115, the MIMO precoder 230-*b* of the base station 105 may adjust the inverse mapping parameter 226 to insure balanced output of a single stream transmission over the plurality of antennas 240 and 250.

At block 540, the method 504 may apply virtual antenna mapping to the at least one overhead block to generate a plurality of mapped overhead blocks each for transmission to the UE 115 over a respective one of the plurality of antennas. Aspects of block 540 may be performed by MIMO transmission management component 305 or virtual antenna mapping component 220-*b* described with reference to FIGS. 2B and 3. The VAM component 220-*b* may map overhead blocks onto the physical antennas 240 and 250 utilizing one or more VAM weights of a VAM matrix 222 for each path.

At block 545, the method 504 may apply a virtual antenna mapping to the plurality of inverse mapped precoded data blocks. Aspects of block 545 may be performed by MIMO transmission management component 305 or virtual antenna mapping component 220 described with reference to FIG. 2B or 3. In some examples, the VAM component 220-*b* may map inverse precoded data block onto the physical antennas 240 and 250 by utilizing one or more VAM weights of a VAM matrix 222 for each path.

At block 550, the method 504 may transmit the data block and the overhead block to the UE over the plurality of antennas. Aspects of block 550 may be performed by MIMO transmission management component 305, such as described with reference to FIGS. 2B, 3 and 6. In this configuration of MIMO transmission management component 305, transmitting the data block and/or overhead blocks may include transmitting a sum of a respective one of the plurality of inverse mapped precoded data blocks, subsequent to the applying of the virtual antenna mapping, and a respective one of the plurality of mapped overhead blocks over a respective one of the plurality of antennas.

Figure 6:
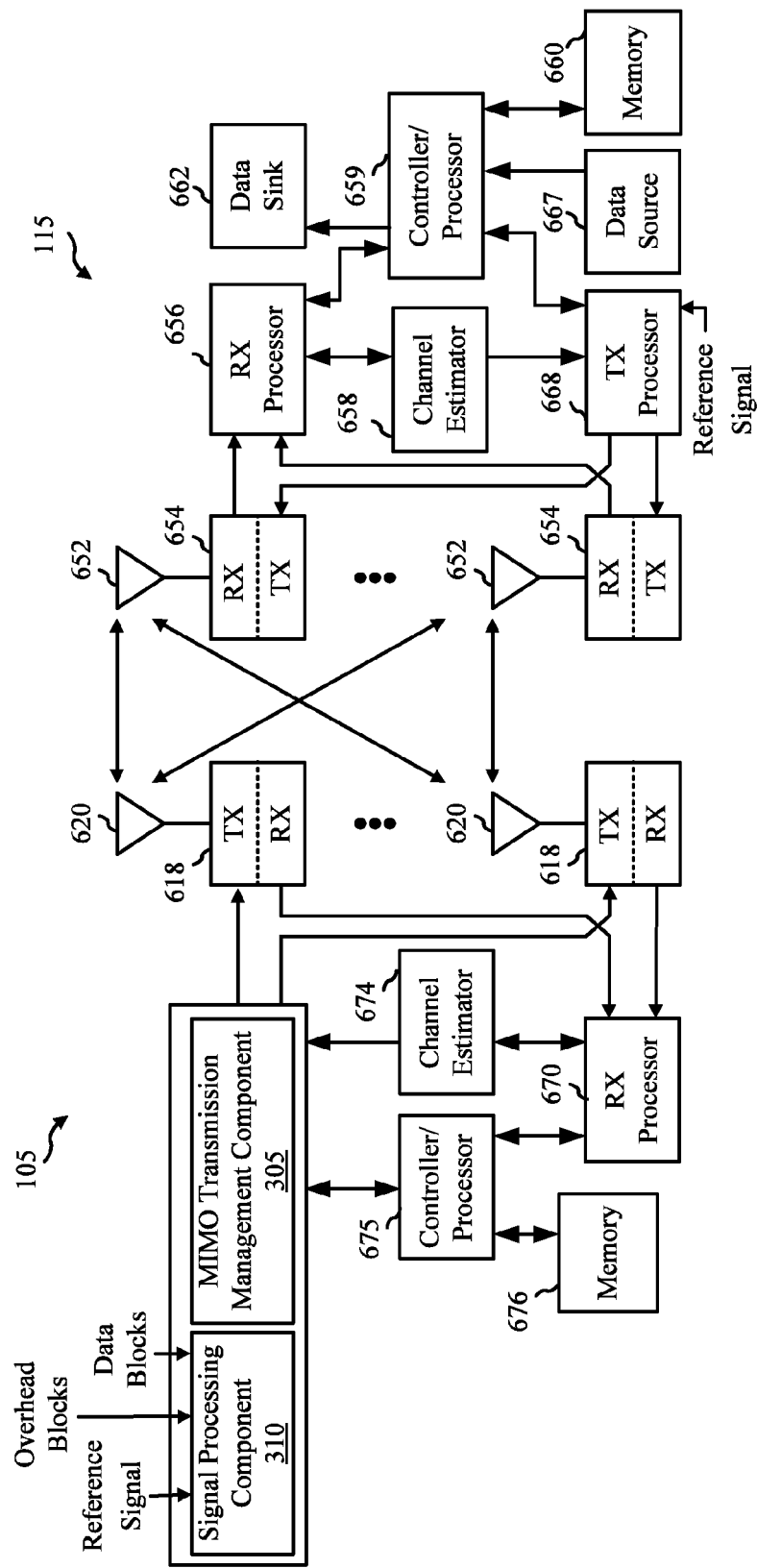
FIG. 6 is a diagram illustrating an example of an implementation for a transmitter in communication with a receiver, wherein the transmitter includes a MIMO system for balancing the power output on a plurality of transmit antennas for a single stream MIMO transmission in accordance with various aspects of the present disclosure.

FIG. 6 is a block diagram of base station 105 in communication with UE 115 in an access network, including some additional components as compared to those described above relating to transmitting or receiving data. In some examples, the controller/processor 675, in collaboration with the MIMO transmission management component 305, may be responsible for balancing output power across a plurality of antennas to the UE 115. The MIMO transmission management component 305 is described, for example, at least with reference to FIGS. 1-5B, and is configured to implement various aspects of the present disclosure.

In some examples, one or more overhead blocks and/or data blocks (control/data signals) may be received by signal processing component 310, processed, and the corresponding modulation symbols passed to the MIMO transmission management component 305. For example, the MIMO transmission management component 305 may receive modulation symbols for one or more overhead blocks from a data source that supplies data for the overhead channels. Additionally or alternatively, the MIMO transmission management component 305 may receive modulation symbols for one or more data blocks associated with the data channel as illustrated in FIGS. 2-3, such as from a data source that supplies data for the data channels. In an aspect, as discussed with reference to FIGS. 2A and 2B, the signal processing component 310 may include a data processing component 315 and control processing component 320 to receive the overhead and/or data blocks for processing, and the MIMO transmission management component 305 may be configured for MIMO-related processing that balances output power across a plurality of antennas to the UE 115.

In some examples, the MIMO transmission management component 305 may also include a VAM component 220 for applying virtual antenna mapping on the transport blocks. The MIMO transmission management component 305 may additionally include a MIMO precoder 230 for precoding data block(s) with a precoding weight for each of the plurality of antennas from an unrestricted precoding weight set (supra). Although, the MIMO transmission management component 305 is shown as a separate module, it should be appreciate that part or all of the functionalities of the MIMO transmission management component 305 may be executed by the controller/processor 675.

The MIMO transmission management component 305 may be responsible for transmitting the transport blocks (e.g., data blocks and overhead blocks) to the UE 115 over the plurality of antennas. In some aspects, transmitting includes transmitting a sum of a respective one of the plurality of precoded data blocks, after bypassing the virtual antenna mapping, and a respective one of the plurality of mapped overhead blocks over a respective one of the plurality of antennas. In other examples, the transmitting includes transmitting a sum of a respective one of the plurality of precoded data blocks, subsequent to the applying of the virtual antenna mapping, and a respective one of the plurality of mapped overhead blocks over a respective one of the plurality of antennas.

It should be noted that, in some examples, the signal processing component 310 and/or MIMO transmission management component 305 may additionally implement various signal processing functions for the L1 layer (i.e., physical layer). The signal processing functions include coding and interleaving to facilitate forward error correction (FEC) at the UE 115 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 115. Each spatial stream may then be provided to a different antenna 620 via a separate transmitter 618TX. Each transmitter 618TX may modulate an RF carrier with a respective spatial stream for transmission.

At the UE 115, each receiver 654RX receives a signal through its respective antenna 652. Each receiver 654RX recovers information modulated onto an RF carrier and provides the information to the receive (RX) processor 656. The RX processor 656 implements various signal processing functions of the L1 layer. The RX processor 656 may perform spatial processing on the information to recover any spatial streams destined for the UE 115. If multiple spatial streams are destined for the UE 115, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 105. These soft decisions may be based on channel estimates computed by the channel estimator 658. The soft decisions are then decoded and deinterleaved to recover the data and control signals that were originally transmitted by the base station 105 on the physical channel. The data and control signals are then provided to the controller/processor 659.

The controller/processor 659 implements the L2 layer. The controller/processor can be associated with a memory 660 that stores program codes and data. The memory 660 may be referred to as a computer-readable medium. In the UL, the controller/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations.

In the UL, a data source 667 is used to provide upper layer packets to the controller/processor 659. The data source 667 represents all protocol layers above the L2 layer. Similar to the functionality described in connection with the DL transmission by the base station 105, the controller/processor 659 implements the L2 layer for the user plane and the control plane by providing header compression, ciphering, packet segmentation and reordering, and multiplexing between logical and transport channels based on radio resource allocations by the base station 105. The controller/processor 659 is also responsible for HARQ operations, retransmission of lost packets, and signaling to the base station 105.

Channel estimates derived by a channel estimator 658 from a reference signal or feedback transmitted by the base station 105 may be used by the TX processor 668 to select the appropriate coding and modulation schemes, and to facilitate spatial processing. The spatial streams generated by the TX processor 668 may be provided to different antenna 652 via separate transmitters 654TX. Each transmitter 654TX may modulate an RF carrier with a respective spatial stream for transmission.

The UL transmission is processed at the base station 105 in a manner similar to that described in connection with the receiver function at the UE 115. Each receiver 618RX receives a signal through its respective antenna 620. Each receiver 618RX recovers information modulated onto an RF carrier and provides the information to a RX processor 670. The RX processor 670 may implement the L1 layer.

The controller/processor 675 implements the L2 layer. The controller/processor 675 can be associated with a memory 676 that stores program codes and data. The memory 676 may be referred to as a computer-readable medium. In the UL, the controller/processor 675 provides demultiplexing between transport and logical channels, packet reassembly, deciphering, header decompression, control signal processing to recover upper layer packets from the UE 115. Upper layer packets from the controller/processor 675 may be provided to the core network. The controller/processor 675 is also responsible for error detection using an ACK and/or NACK protocol to support HARQ operations.

The detailed description set forth above in connection with the appended drawings describes example embodiments and does not represent all the embodiments that may be implemented or that are within the scope of the claims. The term "exemplary," as used in this description, means "serving as an example, instance, or illustration," and not "preferred" or "advantageous over other embodiments." The detailed description includes specific details for the purpose of providing an understanding of the described techniques. These techniques, however, may be practiced without these specific details. In some instances, well-known structures and devices are shown in block diagram form in order to avoid obscuring the concepts of the described embodiments.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, electrically erasable programmable read only memory (EEPROM), compact disk (CD) ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but are to be accorded the broadest scope consistent with the principles and novel features disclosed herein.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, etc. UTRA and E-UTRA are part of Universal Mobile Telecommunications system (UMTS). 3GPP Long Term Evolution (LTE) and LTE-Advanced (LTE-A) are new releases of Universal Mobile Telecommunications System (UMTS) that use E-UTRA. UTRA, E-UTRA, UMTS, LTE, LTE-A, and Global System for Mobile Communications (GSM) are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description above, however, describes an LTE system for purposes of example, and LTE terminology is used in much of the description above, although the techniques are applicable beyond LTE applications.

What is claimed is:

1. A method of transmit power balancing in a multi-antenna wireless communication device, comprising:
    receiving, at a base station, a data block for a single stream transmission of a data channel to a user equipment (UE);
    precoding the data block to generate a plurality of precoded data blocks each for transmission over a respective one of a plurality of antennas at the base station, wherein the precoding includes selecting a precoding weight for each of the plurality of antennas from an unrestricted precoding weight set;

balancing power output on the plurality of antennas for the transmission of the data block, wherein the balancing of the power output on the plurality of antennas comprises having the plurality of precoded data blocks bypass a virtual antenna mapping; and transmitting the data block to the UE over the plurality of antennas.

2. The method of claim 1, further comprising:

receiving, at the base station, at least one overhead block for at least one overhead channel, wherein the at least one overhead block includes control information associated with the data channel;

applying virtual antenna mapping to the at least one overhead block to generate a plurality of mapped overhead blocks each for transmission to the UE over a respective one of the plurality of antennas; and wherein the transmitting includes transmitting a sum of a respective one of the plurality of precoded data blocks, after bypassing the virtual antenna mapping, and a respective one of the plurality of mapped overhead blocks over a respective one of the plurality of antennas.

3. The method of claim 2, wherein the at least one overhead channel comprises at least one of a primary common pilot channel (P-CPICH), a second common pilot channel (S-CPICH), or a primary common control physical channel (P-CCPCH).

4. The method of claim 1, wherein the balancing of the power output on the plurality of antennas comprises:

applying an inverse mapping parameter during the precoding to the data block, or to each of the plurality of precoded data blocks, to generate a plurality of inverse mapped precoded data blocks; and applying a virtual antenna mapping to the plurality of inverse mapped precoded data blocks to generate the plurality of precoded data blocks;

wherein the inverse mapping parameter is an inverse of a mapping parameter.

5. The method of claim 4, further comprising:

receiving, at the base station, at least one overhead block for at least one overhead channel, wherein the at least one overhead block includes control information associated with the data channel;

applying virtual antenna mapping to the at least one overhead block to generate a plurality of mapped overhead blocks each for transmission to the UE over a respective one of the plurality of antennas; and wherein the transmitting includes transmitting a sum of a respective one of the plurality of precoded data blocks, subsequent to the applying of the virtual antenna mapping, and a respective one of the plurality of mapped overhead blocks over a respective one of the plurality of antennas.

6. The method of claim 5, wherein the at least one overhead channel comprises at least one of a primary common pilot channel (P-CPICH), a second common pilot channel (S-CPICH), or a primary common control physical channel (P-CCPCH).

7. The method of claim 1, wherein the data channel comprises a high-speed physical downlink shared channel (HS-PDSCH).

8. The method of claim 1, further comprising receiving a PCI value from the UE, wherein the precoding is based on the received PCI value.

9. The method of claim 1, wherein the unrestricted precoding weight set comprises a set of precoding weights that avoid a precoding weight set restriction.

10. An apparatus for transmit power balancing in a multi-antenna wireless communication device, comprising:

means for receiving, at a base station, a data block for a single stream transmission of a data channel to a user equipment (UE);

means for precoding the data block to generate a plurality of precoded data blocks each for transmission over a respective one of a plurality of antennas at the base station, wherein the means for precoding includes means for selecting a precoding weight for each of the plurality of antennas from an unrestricted precoding weight set;

means for balancing power output on the plurality of antennas for the transmission of the data block, wherein the means for balancing of the power output on the plurality of antennas comprises having the plurality of precoded data block bypass a virtual antenna mapping; and means for transmitting the data block to the UE over the plurality of antennas.

11. The apparatus of claim 10, further comprising:

means for receiving, at the base station, at least one overhead block for at least one overhead channel, wherein the at least one overhead block includes control information associated with the data channel;

means for applying virtual antenna mapping to the at least one overhead block to generate a plurality of mapped overhead blocks each for transmission to the UE over a respective one of the plurality of antennas; and wherein the means for transmitting includes means for transmitting a sum of a respective one of the plurality of precoded data blocks, after bypassing the virtual antenna mapping, and a respective one of the plurality of mapped overhead blocks over a respective one of the plurality of antennas.

12. The apparatus of claim 11, wherein the at least one overhead channel comprises at least one of a primary common pilot channel (P-CPICH), a second common pilot channel (S-CPICH), or a primary common control physical channel (P-CCPCH).

13. The apparatus of claim 10, wherein the means for balancing of the power output on the plurality of antennas comprises:

means for applying an inverse mapping parameter during the precoding to the data block or to each of the plurality of precoded data blocks to generate a plurality of inverse mapped precoded data blocks; and means for applying a virtual antenna mapping to the plurality of inverse mapped precoded data blocks to generate the plurality of precoded data blocks;

wherein the inverse mapping parameter is an inverse of a mapping parameter.

14. The apparatus of claim 13, further comprising:

means for receiving, at the base station, at least one overhead block for at least one overhead channel, wherein the at least one overhead block includes control information associated with the data channel;

means for applying virtual antenna mapping to the at least one overhead block to generate a plurality of mapped overhead blocks each for transmission to the UE over a respective one of the plurality of antennas; and wherein the means for transmitting includes means for transmitting a sum of a respective one of the plurality of precoded data blocks, subsequent to the applying of the virtual antenna mapping, and a respective one of the plurality of mapped overhead blocks over a respective one of the plurality of antennas.

15. The apparatus of claim 14, wherein the at least one overhead channel comprises at least one of a primary common pilot channel (P-CPICH), a second common pilot channel (S-CPICH), or a primary common control physical channel (P-CCPCH).

16. The apparatus of claim 10, wherein the data channel comprises a high-speed physical downlink shared channel (HS-PDSCH).

17. The apparatus of claim 10, further comprising means for receiving a PCI value from the UE, wherein the precoding is based on the received PCI value.

18. The apparatus of claim 10, wherein the unrestricted precoding weight set comprises a set of precoding weights that avoid a precoding weight set restriction.

19. An apparatus for transmit power balancing in a multi-antenna wireless communication device, comprising:
a data processing component configured to receive, at a base station, a data block for a single stream transmission of a data channel to a user equipment (UE);
a multiple-input multiple-output (MIMO) precoder configured to precode the data block to generate a plurality of precoded data blocks each for transmission over a respective one of a plurality of antennas at the base station, wherein the precoding includes selecting a precoding weight for each of the plurality of antennas from an unrestricted precoding weight set;
a balancing configuration for balancing power output on the plurality of antennas for the transmission of the data block by arranging the plurality of precoded data block to bypass a virtual antenna mapping component; and
a transmitter configured to transmit the data block to the UE over the plurality of antennas.

20. The apparatus of claim 19, further comprising:
a control processing component configured to receive, at the base station, at least one overhead block for at least one overhead channel, wherein the at least one overhead block includes control information associated with the data channel;
a virtual antenna mapping component configured to apply virtual antenna mapping to the at least one overhead block to generate a plurality of mapped overhead blocks each for transmission to the UE over a respective one of the plurality of antennas; and
wherein the transmitter is further configured to transmit a sum of a respective one of the plurality of precoded data blocks, after bypassing the virtual antenna mapping, and a respective one of the plurality of mapped overhead blocks over a respective one of the plurality of antennas.

21. The apparatus of claim 20, wherein the at least one overhead channel comprises at least one of a primary common pilot channel (P-CPICH), a second common pilot channel (S-CPICH), or a primary common control physical channel (P-CCPCH).

22. The apparatus of claim 19, wherein the balancing configuration for balancing of the power output on the plurality of antennas comprises:
the MIMO precoder configured to apply an inverse mapping parameter during the precoding to the data block or to each of the plurality of precoded data blocks to generate a plurality of inverse mapped precoded data blocks; and
a virtual antenna mapping (VAM) component configured to apply a virtual antenna mapping to the plurality of inverse mapped precoded data blocks to generate the plurality of precoded data blocks;
wherein the inverse mapping parameter is an inverse of a mapping parameter.

23. The apparatus of claim 22, further comprising:
a control processing component configured to receive, at the base station, at least one overhead block for at least one overhead channel, wherein the at least one overhead block includes control information associated with the data channel;
wherein the VAM component is further configured to apply virtual antenna mapping to the at least one overhead block to generate a plurality of mapped overhead blocks each for transmission to the UE over a respective one of the plurality of antennas; and
wherein the transmitter is further configured to transmit a sum of a respective one of the plurality of precoded data blocks, subsequent to the applying of the virtual antenna mapping, and a respective one of the plurality of mapped overhead blocks over a respective one of the plurality of antennas.

24. The apparatus of claim 23, wherein the at least one overhead channel comprises at least one of a primary common pilot channel (P-CPICH), a second common pilot channel (S-CPICH), or a primary common control physical channel (P-CCPCH).

25. The apparatus of claim 19, wherein the data channel comprises a high-speed physical downlink shared channel (HS-PDSCH).

26. The apparatus of claim 19, further comprising receiving a precoding indicator (PCI) value from the UE, wherein the MIMO precoder is further configured to precode based on the received PCI value.

27. A non-transitory computer-readable medium storing code for transmit power balancing in a multi-antenna wireless communication device, the code comprising instructions executable to:
receive, at a base station, a data block for a single stream transmission of a data channel to a user equipment (UE);
precode the data block to generate a plurality of precoded data blocks each for transmission over a respective one of a plurality of antennas at the base station, wherein the precoding includes selecting a precoding weight for each of the plurality of antennas from an unrestricted precoding weight set;
balance power output on the plurality of antennas for the transmission of the data block, wherein the balancing of the power output on the plurality of antennas comprises having the plurality of precoded data blocks bypass a virtual antenna mapping; and
transmit the data block to the UE over the plurality of antennas.

* * * * *